UNITED STATES PATENT OFFICE.

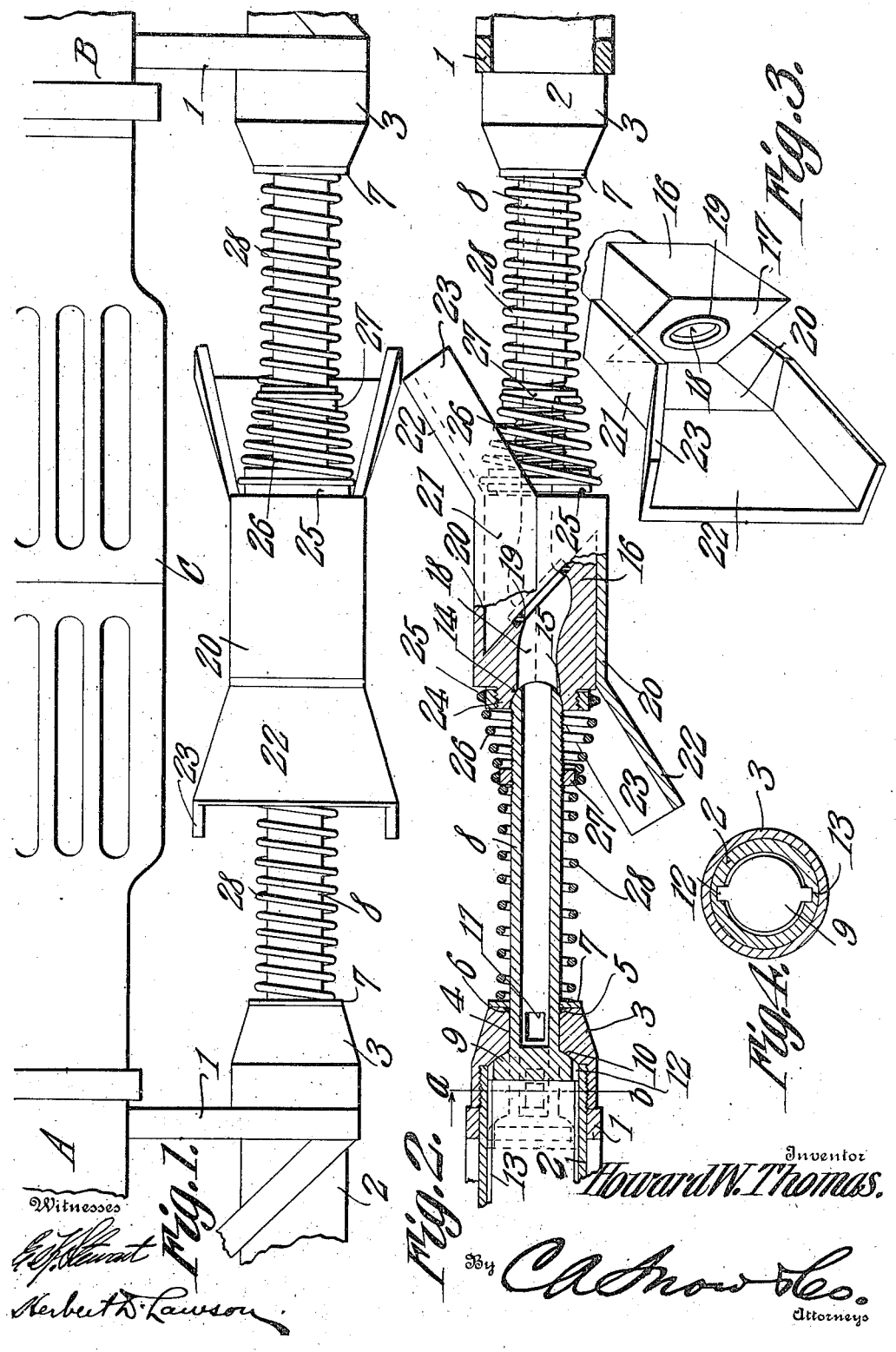

HOWARD W. THOMAS, OF CHARLEROI, PENNSYLVANIA, ASSIGNOR OF ONE-FOURTH TO JAMES EDWARD MANSFIELD, OF MONESSEN, PENNSYLVANIA, AND ONE-FOURTH TO ROY V. LINDSAY, OF CHARLEROI, PENNSYLVANIA.

TRAIN-PIPE COUPLING.

949,046.

Specification of Letters Patent. Patented Feb. 15, 1910.

Application filed April 9, 1909. Serial No. 488,992.

*To all whom it may concern:*

Be it known that I, HOWARD W. THOMAS, a citizen of the United States, residing at Charleroi, in the county of Washington and State of Pennsylvania, have invented a new and useful Train-Pipe Coupling, of which the following is a specification.

This invention relates to improvements in automatic couplers for air-pipes constituting parts of air brake systems.

One of the objects of the invention is to provide a construction which will automatically operate to admit and cut off the supply of air at the time of the coupling and uncoupling of the cars.

Another object is to provide an improved form of coupling head which will permit the pipe at either end of the car to be automatically coupled to the pipe at either end of the adjacent car.

With these and other objects in view, as will hereinafter more fully appear, the present invention consists in certain novel details of construction and combinations of parts, hereinafter fully described, illustrated in the accompanying drawings, and more particularly pointed out in the appended claims.

In the accompanying drawings, forming a part of this specification:—Figure 1 is a side elevation of portions of two cars coupled and showing the device applied thereto. Fig. 2 is a similar view of the device, partly in section, showing, by full and dotted lines, two positions of the port. Fig. 3 is a perspective view of one coupler head. Fig. 4 is a section on line *a—b* Fig. 2.

Referring to the figures by characters of reference, A and B designate the adjoining end portions of two cars, there being couplers C of the usual or any preferred type for automatically securing the cars together when the couplers are brought into contact. Each car is provided at each end thereof with a depending hanger or bracket 1, in which is supported one end of a pipe 2, said end being provided with a bonnet 3 having a guide opening 4 extending therethrough. The outer end of this opening is flared or enlarged as indicated at 5 and constitutes a seat for packing 6, which packing is held in place by means of a disk 7. A tubular stem 8 is slidably mounted within the opening 4 and is provided at one end with an enlargement 9 constituting a valve which is normally in contact with a seat 10 formed about the inner end of the opening 4. The stem 8 is closed at the valve end thereof but one or more openings 11 are formed in the stem adjacent its closed end, said opening constituting means for establishing communication between the interior of the stem 8 and the pipe 2 when the valve 9 is pushed inwardly a predetermined distance. Guide lugs 12 extend radially from the valve 9 and are designed to travel within grooves 13 formed within the pipe 2. These lugs serve to prevent the valve from rotating within the pipe.

The outer end of the tubular stem 8 is open and rounded as indicated at 14, said end being movably mounted within a socket 15 formed in one end of the head 16 of the coupler. The outer end of this head is beveled as indicated at 17 and has a passage 18 opening at the center thereof, said passage extending from the socket 14. A gasket 19 is preferably arranged within the beveled face 17 and around the open end of the passage 18. The beveled face 17 is preferably disposed at 45 degrees to the sides of the head 16. Extending from the small side of the head beyond said beveled face at an angle of 45 degrees thereto, is a guide wing 20 having parallel flanges 21 along the upper and lower edges thereof, said flanges being of the same width and having their free longitudinal edges in the same plane with the longitudinal axis of the head. Each wing is provided at its free end with an extension 22 arranged obliquely thereto and gradually increasing in width toward its free end, there being outwardly diverging flanges 23 along the longitudinal edges of said extension and constituting continuations of the flanges 21. That end of the head 16 which is provided with the socket 15 is reduced annularly to form a screw-threaded extension or boss 24 on which is screwed a ring 25 soldered or otherwise secured within one end of a conical spring 26. The small end of this spring is soldered or otherwise secured to and around a ring 27 screwed on to the stem 8 and said ring also constitutes an abutment for a coiled spring 28 the other end of which bears against the washer 7. It will of course be understood that the spring 28 by bearing against the ring 27 serves to hold the valve 9 normally upon its seat and the port or opening 11 will thus be normally closed. The spring 26 also operates to draw the head 16 firmly against the rounded end of the stem 8 so as to prevent leakage at this point but at the same time permit a limited rocking movement of the head with respect to the stem.

A coupling such as herein described is designed to be placed at each end of a car, and when two cars are brought together so as to be coupled, each wing 20 and its angular extension 22 will serve to guide the head 16 of the opposed air pipe coupling into position to bring the beveled faces of the two heads into contact and cause the ends of the passages 18 to register, the gasket 19 serving to prevent leakage. As the heads 16 normally project beyond the outer ends of the adjoining couplers C it will be apparent that the two heads will come into contact before the couplers C are brought together. As a result the stems 8 will be forced backwardly into the pipes 2 when the cars are coupled together, and the ports 11 will thus be opened and communication established between the pipes 2 of the two cars through the stems 8 and the heads 16. By providing the ball and socket connection between the stems 8 and the heads 16 it becomes possible for the couplings of the air pipes to flex laterally to correspond with the relative movements of the couplers C. It will of course be understood that when the cars are uncoupled the springs 28 will operate to return the valves 9 to their seats, thus cutting off the passage of air through the stems 8.

Obviously various changes may be made in the construction and arrangement of the parts without departing from the spirit or sacrificing the advantages of the invention.

What is claimed is:—

1. The combination with a pipe having a valve seat, of a tubular stem slidably mounted within the pipe, said stem having a normally closed port, a valve upon the stem, a spring upon said stem for holding the valve normally upon the valve seat, a coupling head movably engaging one end of the stem, said head having a passage therethrough opening into the stem, a spring connection between the stem and the head, and a guide wing extending from the head, said wing having oppositely disposed receiving flanges.

2. The combination with a pipe having a valve seat, of a tubular stem slidably mounted within said pipe and having a normally closed port, a valve at one end of the stem, a spring engaging the stem for holding the valve normally upon the seat, a head movably mounted upon one end of the stem, an elastic connection between the head and the stem, said head having a passage therethrough opening into the stem, the outer or working face of the head being beveled, a wing extending beyond said beveled face and having an oblique extension, longitudinal flanges along the wing and its extension, said flanges coöperating with a beveled face to form a head-receiving socket, the extension and its wing constituting a guide.

3. An air brake coupling comprising a movably mounted tubular stem, a head movably mounted on the stem and having a passage communicating with the interior of said stem, elastic means for holding the stem and head together, an angular wing extending from the head and coöperating with one face thereof to form a head-receiving socket, and flanges extending from the wing.

4. An air brake coupling comprising a movably mounted tubular stem, the stem having rounded ends, a head having a passage therethrough and a socket at one end of the passage, said socket constituting a seat for the rounded end of the stem, a ring secured upon the stem, a ring secured to the head, and a spring fixedly secured at its ends to said rings for holding the head and stem in engagement.

5. An air brake coupling comprising a movably mounted tubular stem, a head movable laterally relative to the stem and having a passage communicating with the interior of the stem, and a spring surrounding the stem and secured to the stem and head for holding the same normally in a predetermined relation.

In testimony that I claim the foregoing as my own, I have hereto affixed my signature in the presence of two witnesses.

HOWARD W. THOMAS.

Witnesses:
R. F. ELLIOTT,
GEO. STABLEIN.